Figure 3:
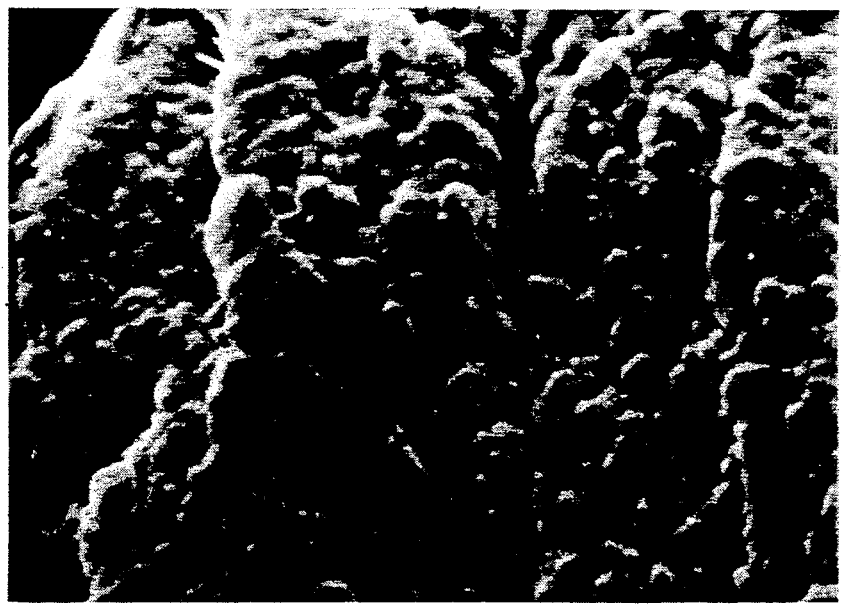

United States Patent
Heinz et al.

[11] Patent Number: 5,151,458
[45] Date of Patent: Sep. 29, 1992

[54] HIGHLY FLUID POLYARYLENE SULPHIDE MOULDING COMPOUNDS

[75] Inventors: Hans-Detlef Heinz; Harald Pielartzik, both of Krefeld; Klaus Reinking, Wermelskirchen; Rolf-Volker Meyer, Krefeld; Siegfried Korte, Odenthal, all of Fed. Rep. of Germany

[73] Assignee: Bayer Aktiengesellshcaft, Leverkusen, Fed. Rep. of Germany

[21] Appl. No.: 515,705

[22] Filed: Apr. 27, 1990

[30] Foreign Application Priority Data

May 9, 1989 [DE] Fed. Rep. of Germany ....... 3915067

[51] Int. Cl.$^5$ .................................................. C08J 3/20
[52] U.S. Cl. .................................. 524/190; 524/198; 524/219; 524/237; 524/293; 524/299
[58] Field of Search ............... 524/198, 199, 210, 227, 524/282, 190, 219, 237, 293, 299, 451; 528/388

[56] References Cited

U.S. PATENT DOCUMENTS

| | | | |
|---|---|---|---|
| 4,276,397 | 6/1981 | Froix et al. | 524/339 |
| 4,933,386 | 6/1990 | Nitoh et al. | 524/451 |
| 4,942,194 | 7/1990 | Bier et al. | 524/293 |

FOREIGN PATENT DOCUMENTS

| | | | |
|---|---|---|---|
| 082150 | 6/1980 | Japan | 524/293 |
| 045654 | 2/1987 | Japan . | |

Primary Examiner—Paul R. Michl
Assistant Examiner—Yong S. Lee
Attorney, Agent, or Firm—Connolly and Hutz

[57] ABSTRACT

This invention relates to new highly fluid polyarylene sulphide-(PAS)-moulding compounds, preferably polyphenylene sulphide-(PPS)-moulding compounds containing low molecular weight, liquid crystalline ester-(amide)s.

14 Claims, 3 Drawing Sheets

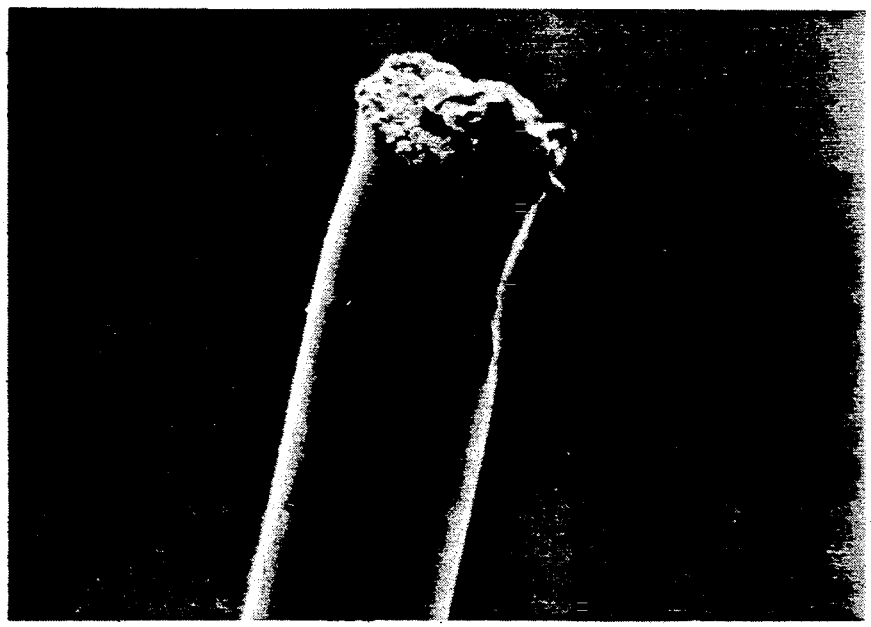
*with additive  fibre segment*
*Fig. 1.*   7.3 μm
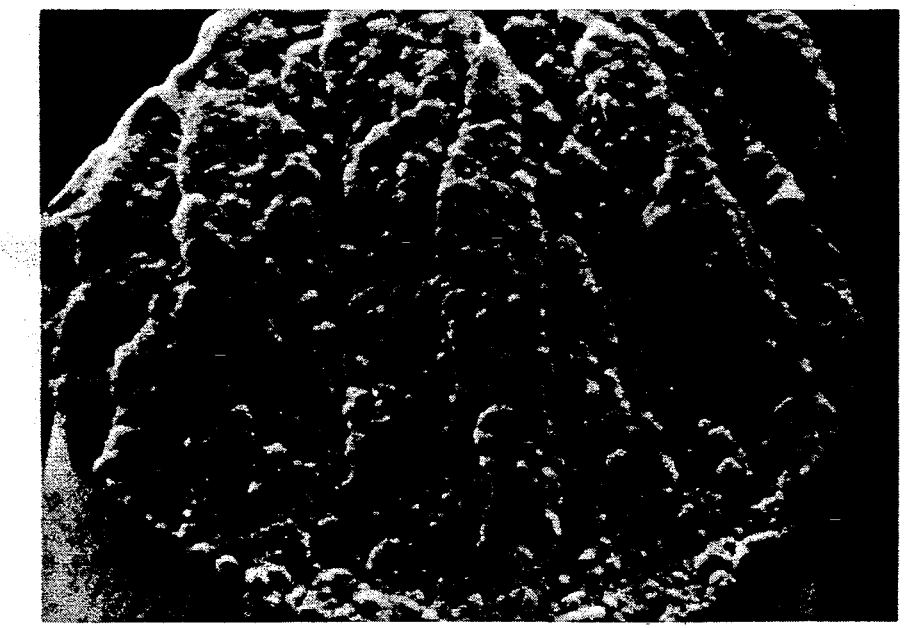
*with additive  break surface*
*Fig. 2.*   1.8 μm

*with additive*  *break surface*

$\overline{0.9 \mu m}$

*without additive*  *fibre segment*

$\overline{7.3 \mu m}$

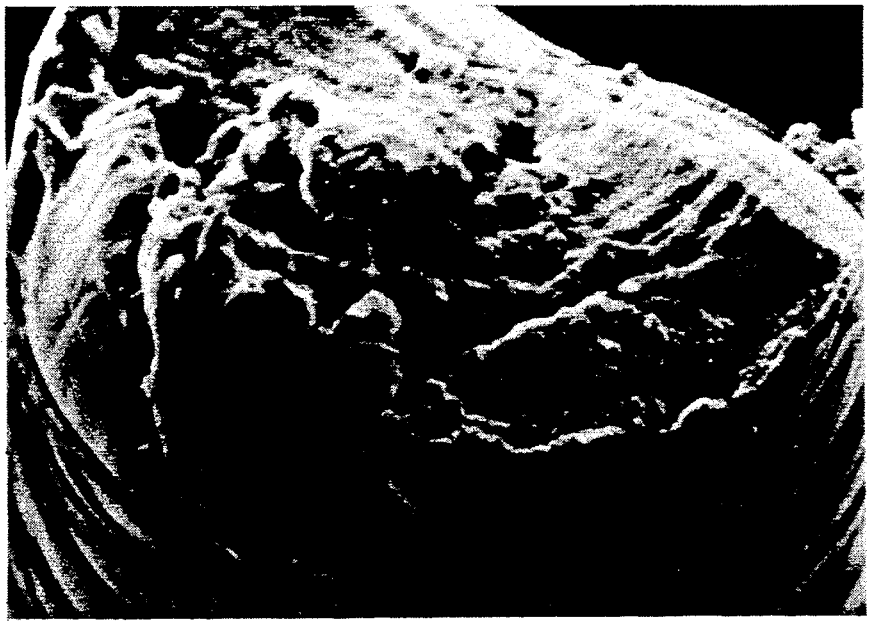
*without additive*     *break surface*
*Fig. 5.*    1.8 μm
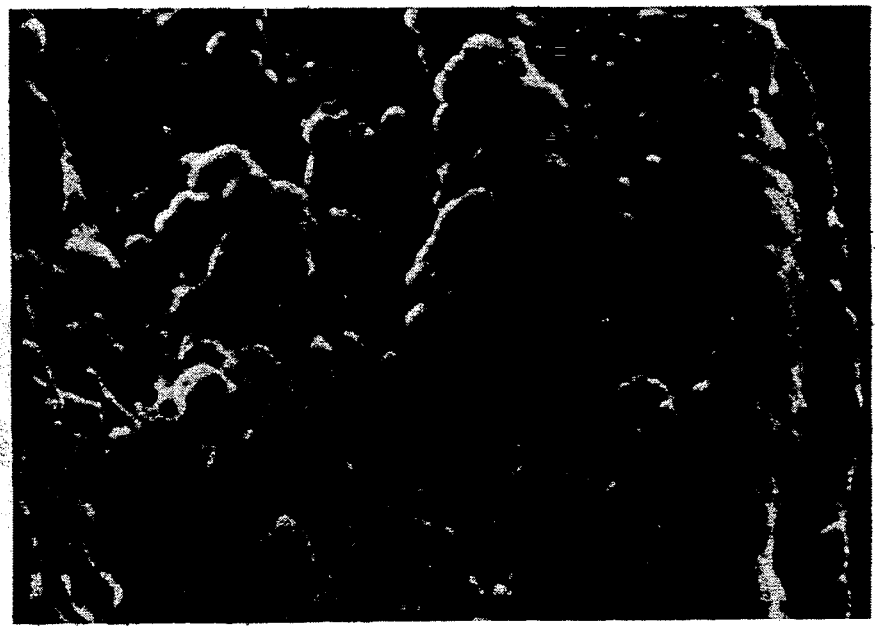
*without additive*     *break surface*
0.9 μm
*Fig. 6.*

HIGHLY FLUID POLYARYLENE SULPHIDE MOULDING COMPOUNDS

This invention relates to new highly fluid polyarylene sulphide-(PAS)-moulding compounds, preferably polyphenylene sulphide-(PPS)-moulding compounds, containing low molecular weight, liquid crystalline ester-(amide)s.

Arylene sulphide polymers are increasingly of interest for the electrical industry and other industrial fields as thermoplasts which are not only inert and resistant to high temperatures but also can be filled with a high proportion of glass fibres and/or other materials.

These polymers, especially polyparaphenylene sulphide (PPS), are being increasingly used as more easily processed materials, especially in fields which were hitherto the preserve of duroplasts.

Polyarylene sulphide moulding compounds suitable for injection moulding and optionally containing glass fibres and/or mineral fillers at high concentrations are generally distinguished by their low viscosities in the molten state.

These materials can therefore generally be injection moulded without any difficulty.

Difficulties may, however, arise in the production of thin walled moulded parts if the flow paths of the melt in the mould are very long. This may in particular be the case if, for the sake of preventing tension in the material the gates are so placed that preferential orientation of the glass fibres results. In the production of such moulded parts it may be difficult to completely fill the moulds in spite of the low viscosities of the melts. This may be due to the PPS melts solidifying extremely rapidly on cooling.

An indication for this is the high crystallisation temperature, e.g. of PPS, i.e. the temperature at which crystallisation sets in when the polymer melts cool down. DSC measurements have shown that this crystallisation temperature is about 230° to 250° C.

If the flow path of the melt is long, therefore, the melt may already cool down sufficiently in the process of filling the mould that it undergoes solidification with increase in viscosity. Complete filling of the mould may then become difficult. Usually if solidification of the melt sets in before the mould has been completely filled, the mechanical strength of the moulded products obtained is impaired and, if the moulding compounds contain reinforcing agents or fillers, then the products show surface defects at some distance from the gate.

The moulds should therefore be filled rapidly to ensure complete filling. In many cases this is only possible if the melt viscosities are sufficiently low.

For processing polyarylenesulphide moulding compounds optionally reinforced with fibres or filled with mineral fillers it would therefore be advantageous to obtain a marked lowering of the melt viscosity, preferably without thereby negatively influencing the high degree of crystallisation of the polymers.

The possibility of lowering the melt viscosity of arylene sulphide polymers by lowering the molecular weight is, however, limited by the fact that the mechanical strength properties of polyarylene sulphide moulding compounds are drastically reduced when the molecular weights of the polyarylene sulphides are too low.

It has now surprisingly been found that the melt viscosity of polyarylene sulphides can be markedly reduced without adversely affecting the degree of crystallinity of the polymer and without reducing the molecular weight of the polyarylene sulphide by adding selected low molecular weight, liquid crystalline esters and/or ester amides.

This invention therefore relates to new highly fluid polyarylene sulphide moulding compounds, characterised in that they consist of A) from 70-99.9% by weight of polyarylene sulphides, preferably polyparaphenylene sulphide B) from 0.1-30% by weight of one or more low molecular weight, liquid crystalline esters and/or ester amides of the general structural type corresponding to formula (I):

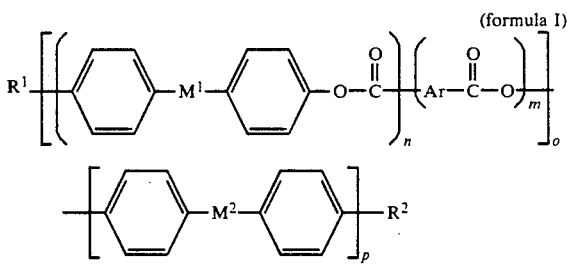

wherein

—Ar denotes a mononuclear or multinuclear aromatic group containing 6–20 carbon atoms and the multinuclear group may be attached by a bond or by condensation, and $R^1$ and $R^2$ denote, independently of one another, H, chlorine, $O-C_1-C_4$-alkyl, $O-C_3-C_6$-cycloalkyl, $O-C_6-C_{14}$-aryl, $C_1-C_4$-alkyl, $C_3-C_6$-cycloalkyl, $C_6-C_{14}$-aryl, fluorinated $C_1-C_4$-alkyl, fluorinated $C_3-C_6$-cycloalkyl or fluorinated $C_6-C_{14}$-aryl, the fluorinated alkyl, cycloalkyl or aryl having at least one, at maximum all, hydrogen atoms replaced by fluorine atoms, or $R^1$ and $R^2$ denote a group corresponding to one of the formulae (1)/a to (1)/1:

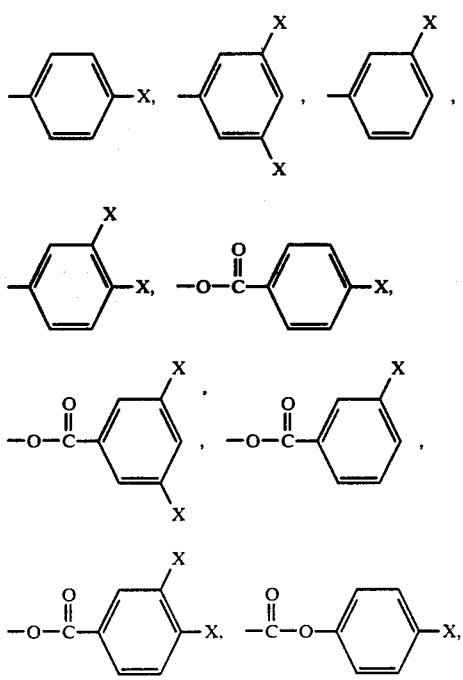

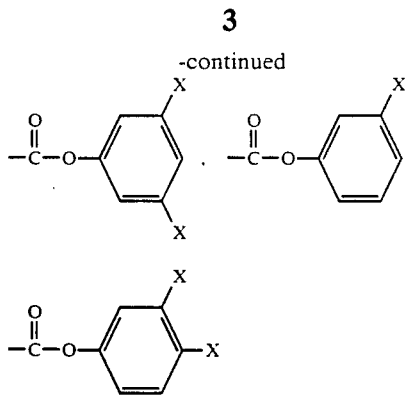

(the numbers (1.a)-(1.11) denote the sequence in which the groups are shown),
wherein
X has the same meanings as $R^1$ and $R^2$ from H to fluorinated $C_6$-$C_{14}$-aryl, and
$M^1$ and $M^2$ may be identical or different and denote double-bonded groups corresponding to formulae I.1) to I.11):

$$-\underset{\underset{O}{\|}}{C}-O-, \quad -\underset{\underset{O}{\|}}{C}-NH-, \quad -N=N-, \quad -N=N-, \\ \downarrow \\ O$$

$$-CH=N-, \quad -CH=CH-, \quad -C\equiv C-, \quad -O-\underset{\underset{O}{\|}}{C}-,$$

$$-HN-\underset{\underset{O}{\|}}{C}-, \quad -N=N- \text{ and } -N=CH- \\ \downarrow \\ O$$

(formulae (I.1)–(I.11) are again shown in sequence) and
m stands for zero, 1 or 2,
n stands for 1 or 2,
o stands for 1,2,3 or 4 and
p stands for zero or 1, but when p =0,
$R^2$ may only be (1a), (1b), (1c) or (1d)
and/or
liquid crystalline ester and/or ester amide oligomers of the structural type corresponding to formula (II) with random distribution of the structural units:

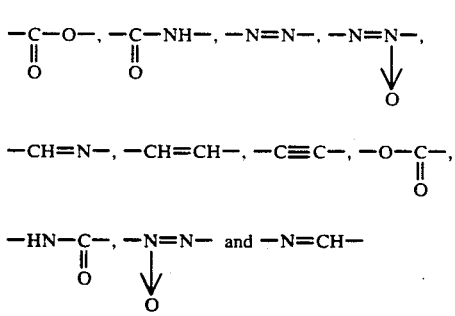

(II)

wherein
$R^3$ stands for a $C_1$-$C_{20}$-alkyl group, preferably a methyl group, or an optionally substituted preferably a mono- or di-substituted $C_6$-$C_{20}$-aryl group, preferably a phenyl group,

is always an end group)

$Ar^a$ denotes a bivalent, optionally substituted (substituents same as in $R^3$) mononuclear or polynuclear aromatic group having 6-24 carbon atoms, and the mononuclear group may be directly attached or condensed, $Ar^b$ denotes a bivalent, optionally substituted mononuclear or polynuclear aromatic group containing 6-30 carbon atoms and the polynuclear group may be linked in various ways, $R^4$ and $R^5$ stand for $C_mH_{2m}$ where m=0 to 40 ($R_4$) and 3 to 40 ($R_5$), or an optionally substituted bivalent mononuclear or polynuclear aromatic group having 6-24 carbon atoms and if the group is polynuclear, it may be either linked through a bond or attached as a condensed group, $Y'$ stands for O,

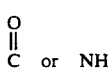

but when it is linked to an end group

then $Y'$ stands for O or NH, and
 b=0 to 10, preferably 0 to 8, in particular 0 to 4,
 c=1 to 9, preferably 1 to 7, in particular 1 to 4,
 d=0 to 9, preferably 0 to 7, in particular 0 to 3, and
 e=0 to 3, preferably 0 to 2, and the end groups are formed by structural elements of the type

and
C) optionally from 0.001 to approximately 300% by weight, based on the sum of the weight of components A) and B), of other additives.

This invention also relates to a process for the preparation of the arylene sulphide polymer moulding compounds according to the invention.

The invention further relates to the use of the moulding compounds according to the invention for the production of moulded articles, e.g. by the process of injection moulding, the production of films, e.g. by extrusion, and the production of fibres, filaments, monofilament fibres and fabrics, e.g. by melt spinning and optionally further processing, and the production of other articles, for example, composites.

The moulded articles, films, fibres, composites etc. produced from the moulding compounds according to the invention are also a subject of this invention.

Compounds corresponding to formula (I):

Particularly preferred groups Ar corresponding to formula (I) and groups $Ar^a$ and $Ar^b$ corresponding to formula (II) are the groups (Ar1) to (Ar4):

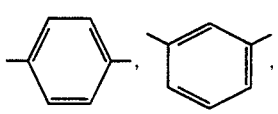

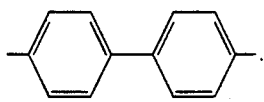

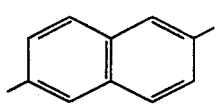

(Ar1)–(Ar4) are shown in their sequence.

The following are preferred groups $R^1$ and $R^2$: H, $CH_3$, $OCH_3$, cyclohexyl, phenyl, $CF_3$, $OCF_3$, fluorinated cyclohexyl and fluorinated phenyl (in each of which at least one and at maximum all the hydrogen atoms of the corresponding non-fluorinated group are replaced by fluorine).

Preferred groups —M— are those corresponding to the formulae (I.1), (I.2), (I.5), (I.8), (I.9) and (I.11).

The following are preferred index combinations m, n, o, p and q:

m=zero, n=1, o=1, p=zero;
m=zero, n=1, o=1, p=1;
m=zero, n=2, o=1, p=1;
m=n=o=p=1;
m=1, n=1, o=2, p=1;
m=zero, n=2, o=1, p=zero;
m=1, n=2, o=1, p=1 and
m=1, n=1, o=3, p=1.

The compounds corresponding to formula (I) are distinguished in that they pass through a liquid crystalline phase in the course of melting (for information on liquid crystalline compounds and phases see, for example, D. Demus, L. Richter, Textures of Liquid Crystals, published by Verlag Chemie, Weinheim—New York 1978, or H. Kelker, R. Hatz, Handbook of Liquid Crystals, published by Verlag Chemie, Weinheim, Deerfield, 1980).

Preferred compounds corresponding to formula (I) are those containing 3 to 25 aromatic partial structures, the group Ar being selected as a partial structure regardless of whether it is mononuclear or polynuclear. Particularly preferred compounds of formula (I) are those containing 4 to 15 aromatic partial structures, the group Ar being again selected as an aromatic partial structure regardless of whether it is mononuclear or polynuclear. Particularly preferred compounds of formula (I) have from 4 to 10 aromatic partial structures in the sense defined above.

The following four groups of compounds (I,A) to (I.D) are mentioned as examples of compounds corresponding to formula (I):

(I,A) Liquid crystalline compounds of formula (I) having three aromatic partial structures, wherein m=zero, n=1, o=1 and p=zero:

(Formula IA)

$R^1-\phenyl-M^1-\phenyl-O-\overset{O}{\underset{\|}{C}}-R^2$

| No. | $R^1$ | $M^1$ | $R^2$ |
|---|---|---|---|
| 1 | $CH_3$ | $-\overset{O}{\underset{\|}{C}}-O-$ | –phenyl–$OCH_3$ |
| 2 | $CH_3O-$ | $-O-\overset{O}{\underset{\|}{C}}-$ | –phenyl–$OCH_3$ |
| 3 | $CH_3O-$ | $-O-\overset{O}{\underset{\|}{C}}-$ | –phenyl–$CH_3$ |
| 4 | $CH_3$ | $-O-\overset{O}{\underset{\|}{C}}-$ | –phenyl–$OCH_3$ |

(I,B) Liquid crystalline compounds of formula (I) having four aromatic partical structures, in which again m=zero, n=1, o=1 and p=zero:

(Formula IB)

$R^1-\phenyl-M^1-\phenyl-O-\overset{O}{\underset{\|}{C}}-R^2$

| No. | $R^1$ | $M^1$ | $R^2$ |
|---|---|---|---|
|  | $X^1-\phenyl-\overset{O}{\underset{\|}{C}}-O-$ | $-\overset{O}{\underset{\|}{C}}-O-$ | $-\phenyl-X^2$ |
| 5 | $X^1=H$ | | $X^2=H$ |
| 6 | $CH_3$ | | $CH_3$ |
| 7 | $OCH_3$ | | $OCH_3$ |
| 8 | $CF_3$ | | $CF_3$ |
| 9 | Cl | | Cl |

(I,C) Liquid crystalline compounds of formula (I) having five aromatic partial structures, in which m=n=n=p=1.

(Formula IC)

$R^1-\phenyl-M^1-\phenyl-O-\overset{O}{\underset{\|}{C}}-Ar-\overset{O}{\underset{\|}{C}}-O-\phenyl-M^2-\phenyl-R^2$

| No. | $R^1$ | $M^1$ | $M^2$ | $R^2$ | Ar |
|---|---|---|---|---|---|
| 10 | H | $-O-\overset{O}{\underset{\|}{C}}-$ | $-\overset{O}{\underset{\|}{C}}-O-$ | H | –phenyl– |
| 11 | $CH_3$ | " | " | $CH_3$ | " |

(Formula IC)

| No. | R¹ | M¹ | M² | R² | Ar |
|---|---|---|---|---|---|
| 12 | OCH₃ | " | " | OCH₃ | " |
| 13 | H |  |  | H | " |
| 14 | CH₃ | " | " | CH₃ | " |
| 15 | OCH₃ | " | " | OCH₃ | " |

(I,D) Liquid crystalline compounds of formula (I) having seven aromatic partial structures, in which again $m=n=o=p=1$:

(Formula ID)

| No. | R¹ | M¹ | Ar | M² | R² |
|---|---|---|---|---|---|
| 16 |  | —C—O—<br>‖<br>O |  | —O—C—<br>‖<br>O |  |
| 17 | (similar structures) | | | | |
| 18 | | | | | |
| 19 | | | | | |

The compounds of formula (I) are added to the arylene sulphide polymers in quantities of from 0.1 to 30% by weight, preferably from 1 to 20, most preferably from 2 to 15% by weight.

Compounds corresponding to formula (II):

Preferred groups R³ corresponding to formula (II) are alkyl groups having 1 to 30, most preferably 1 to 22 carbon atoms, such as CH₃, C₂H₅, C₃H₇, C₄H₉, C₅H₁₁, C₆H₁₃, C₁₅H₃₁, C₁₆H₃₃, C₁₇H₃₅, C₁₈H₃₇, C₁₉H₃₉ and C₂₂H₄₅, the group CH₃ being particularly preferred, and aromatic groups corresponding to formulae (III), (IIIa) and (IV):

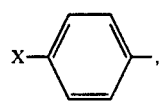 (III)

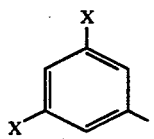 (IIIa)

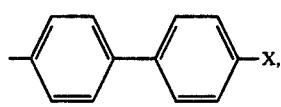 (IV)

wherein

X denotes hydrogen, halogen, NO₂, C₁-C₄-alkyl, C₃-C₆-cycloalkyl, C₆-C₁₄-aryl, O—C₁-C₄-alkyl, O—C₃-C₆-cycloalkyl, fluorinated C₁-C₄-alkyl, fluorinated C₃-C₆-cycloalkyl and fluorinated C₆-C₁₄-aryl (the term "fluorinated" having the meaning already defined above).

Aromatic groups corresponding to formulae (V) and (VI) are particularly preferred as groups R³:

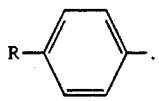 (V)

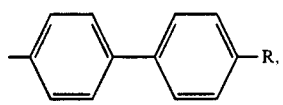 (VI)

wherein

R stands for hydrogen, halogen such as fluorine or chlorine. $C_1$-$C_4$-alkyl, $C_3$-$C_6$-cycloalkyl, O—$C_1$-$C_4$-alkyl, O—$C_3$-$C_6$-cycloalkyl, fluorinated $C_1$-$C_4$-alkyl or fluorinated $C_3$-$C_6$ cycloalkyl (the term "fluorinated" having the meaning defined above).

Those aromatic groups of formulae (V) and (VI) in which R=hydrogen are particularly preferred.

Preferred monocarboxylic acids from which the group

is derived include inter alia benzoic acid, 4-methylbenzoic acid, 4-methoxybenzoic acid and 4.biphenylcarboxylic acid. Particularly preferred among these are inter alia benzoic acid, 4-methylbenzoic acid and 4-biphenylcarboxylic acid.

The bivalent aromatic groups ($Ar^a$) in formula (II) may be groups on which aromatic hydroxycarboxylic acids corresponding to the following formulae are based:

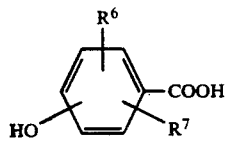 (VII)

and

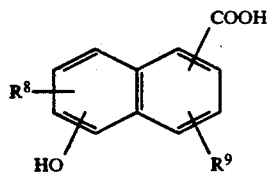 (VIII)

in which formulae, $R^6$ to $R^9$ denote $C_1$-$C_4$-alkyl (preferably methyl or ethyl), $C_1$-$C_4$-alkoxy (preferably methoxy or ethoxy), $C_6$-$C_{10}$-aryl or aryloxy (preferably phenyl, phenyl oxy, naphthyl, naphthyloxy, biphenyl, biphenyloxy, tolyl or tolyloxy), $C_7$-$C_{12}$-alkylaryl (preferably benzyl), halogen (preferably chlorine or bromine) or hydrogen and the valencies between the nucleus and the hydroxyl group and between the nucleus and the carboxyl group form an angle from 45° to 180°.

The following are preferred aromatic hydroxycarboxylic acids: 4-Hydroxy-3-methylbenzoic acid, 4-hydroxy-3-methoxybenzoic acid, 4-hydroxybenzoic acid, 3-hydroxybenzoic acid and 6-hydroxy-2-naphthoic acid. 4-Hydroxybenzoic acid, 3-hydroxybenzoic acid and 6-hydroxy-2-naphthoic acid are particularly preferred.

The aromatic hydroxycarboxylic acids preferably have the OH group placed symmetrically (1,4-phenylene or 2,6-naphthylene or 4,4'-diphenyl positions) to the carboxyl group.

The bivalent aromatic groups ($Ar^b$) corresponding to formula (II) may be groups on which diphenols corresponding to formula (IX) are based:

HO—Z—OH (IX)

in which formula,

Z denotes a divalent, mononuclear or polynuclear aromatic group having 6 to 30 carbon atoms and the structure of Z is such that the two OH groups are directly attached each to a carbon atom of an aromatic system and the two valencies form an angle from 45° to 180°.

The aromatic groups may be substituted by 1 to 4 $C_1$-$C_4$-alkyl, $C_1$-$C_4$ alkoxy, phenyl, phenoxy, benzyl or halogen groups (preferably chlorine or bromine) and comprise not only m/p-phenylene, 2,6- or 1,5-naphthylene and 4,4'-biphenylene groups but also phenylene groups by oxygen, sulphur, carbonyl, sulphonyl or azomethine, $C_1$-$C_{18}$, preferably $C_1$-$C_4$-alkylene or alkylidene, (alkyl substituted) cyclohexylene or cyclohexylidene, or —O($CH_2$)$_n$O— in which n=2 to 4.

The following are examples of preferred diphenols: Hydroquinone, 4,4'-dihydroxydiphenyl, 4,4'-dihydroxydiphenylether, 4,4'-dihydroxydiphenylethane, 4,4'-dihydroxydiphenoxyethane, 3,5'-dihydroxydiphenyl, 3,5'-dihydroxydiphenylether, 1,5-dihydroxynaphthalene, 2,6-dihydroxynaphalene, 1,4-dihydroxynaphthalene, methylhydroquinone, phenylhydroquinone, ethylhydroquinone, 2,2'-dimethyl-4,4'-dihydroxydiphenyl, 3,3',5,5'-tetramethyl-4,4'-dihydroxydiphenyl, 1,2-(2-chloro-4-hydroxyphenoxy)-ethane, 4-methoxy-2,6-dihydroxynaphthalene, resorcinol, 3,4'-dihydroxydiphenyl, 1,6-dihydroxynaphthalene, 1,7-dihydroxynaphthalene, 2,7-dihydroxynaphthalene, 4-chlororesorcinol, 4-phenylresorcinol, 4-ethoxyresorcinol, 2,5-dichloro-1,6-dihydroxynaphthalene and 4-methoxy-2,7-dihydroxynaphthalene.

Hydroquinone and 4,4'-dihydroxydiphenyl are particularly preferred diphenols.

The bivalent groups ($R^4$) of formula (II) may be groups on which the dicarboxylic acids corresponding to formula (X) are based:

HOOC—$R^4$—COOH (X)

wherein $R^4$ stands for $C_mH_{2m}$ where m=0 to 40, preferably 0 to 20 or 30-38, or preferably a bivalent aromatic group having 6 to 24 carbon atoms, preferably 6 to 16 carbon atoms, and the two valencies enclose an angle from 45° to 180°. The bivalent aromatic groups may be substituted by 1 to 4 $C_1$-$C_4$-alkyl, $C_1$-$C_4$-alkoxy, phenyl, phenoxy or benzyl groups or by halogens (preferably chlorine or bromine) and comprise not only 1,4-phenylene groups and 1,5- or 2,6-naphthylene groups and 4,4'- or 3,5'-biphenylene groups but also phenylene groups linked by oxygen, sulphur, carbonyl, sulphonyl, $C_1$-$C_4$-alkylene or alkylidene, cyclohexylene or hexylidene or O($CH_2$)$_n$O where n=1 to 4, preferably in symmetrical substitution ("para-position").

The following aliphatic dicarboxylic acids are preferred: Oxalic acid, succinic acid, adipic acid, suberic acid, azelaic acid, trimethyladipic acid, sebacic acid, dodecane diacid and dimeric fatty acids.

It is particularly preferred to use oxalic acid, adipic acid, sebacic acid and dimeric fatty acids.

Preferred aromatic dicarboxylic acids include those which groups are based on the following bivalent groups: 1,4-Phenylene, 1,4 naphthylene or 4,4'-biphenylene, in which the two bonds extend coaxially in opposite directions, 1,5-naphthylene groups, 2,6-naphthylene groups and 3,5'-biphenylene groups, in which the two bonds extending in opposite directions are shifted parallel to one another, and 1,3-phenylene groups, 1,3-, 1,6-, 1,7- or 2,7-naphthylene groups or 3,4'-biphenylene groups, in which the two bonds are not localized on adjacent atoms and do not extend in opposite directions either coaxially or with a parallel shift.

The following are preferred aromatic dicarboxylic acids: 1,4-Naphthalene dicarboxylic acid, 1,5-naphthalene dicarboxylic acid, 2,6-naphthalene dicarboxylic acid, biphenyl-4,4'-dicarboxylic acid, biphenyl-3,3'-dicarboxylic acid, diphenoxyethane-4,4'-dicarboxylic acid, diphenylether-4,4'-dicarboxylic acid, methyl terephthalic acid, methoxyterephthalic acid, chloroterephthalic acid, 4-chloronaphthalene 2,7-dicarboxylic acid, 2,6- and 2,7-naphthalene dicarboxylic acid, biphenyl-3,4'-dicarboxylic acid, 4-methylisophthalic acid, 5-methylisophthalic acid, diphenylether-4,4'-dichloro-3,3'-dicarboxylic acid and iso- and terephthalic acid.

Iso- and terephthalic acid are particularly preferred.

The dicarboxylic acids used may be exclusively aliphatic or aromatic or mixtures of the two. It is preferred to use at least a proportion of aromatic dicarboxylic acids and most preferably only aromatic dicarboxylic acids.

The bivalent groups ($R^5$) of formula (II) may be groups on which the amino compounds corresponding to formula (XI) are based:

$$H_2N-R^5-Y \qquad (XI)$$

wherein $R^5$ stands for $C_mH_{2m}$ in which $m = 3$ to 40, preferably 6 to 12, and a cycloaliphatic group $C_mH_{2m-2}$ having 5 to 20, preferably 5 to 15 carbon atoms (5 or 6 ring carbon atoms) and Y stands for OH, COOH or $NH_2$, or $R^5$ denotes a bivalent aromatic group having 6 to 24 carbon atoms, preferably 6 to 16 carbon atoms, and the two valencies form an angle from 45 to 180°. The bivalent aromatic groups may be substituted by 1 to 4 $C_1$-$C_4$-alkyl, $C_1$-$C_4$-alkoxy, phenyl, phenoxy or benzyl groups or by halogen (preferably chlorine or bromine) and comprise phenylene, naphthylene and biphenylene groups as well as phenylene groups which are linked by oxygen, sulphur, carbonyl, sulphonyl, $C_1$-$C_4$-alkylene or alkylidene, cyclohexylene or hexylidene or $-O(CH_2)_nO-$ in which $n = 1$ to 4.

Instead of aliphatic aminocarboxylic acids, the corresponding lactams may be used, e.g. caprolactam may be used instead of ε-aminocaproic acid.

The following are preferred (cyclo)aliphatic aminocarboxylic acids: ε-Aminocaproic acid and caprolactam, ω-aminoundecanoic acid, ω-aminododecanoic acid and lauryl lactam and 4-aminocyclohexylcarboxylic acid. 4-Aminobenzoic acid and 6-amino-2-naphthoic acid are preferred aromatic aminocarboxylic acids. ε-Aminocaproic acid or caprolactam, 4-aminobenzoic acid and 6-amino-2-naphthoic acid are particularly preferred.

The following are examples of preferred aminophenols: 3-Aminophenol, 4-aminophenol, 3-amino-2-methylphenol, 3-amino-4-methylphenol, 5-amino-1-naphthol, 6-amino-1-naphthol, 5-amino-2-naphthol, 7-amino-2-naphthol, 8-amino-2-naphthol, 6-amino-2-naphthol and 4'-amino-1-hydroxybiphenyl. 4-Aminophenol, 3-aminophenol and 4'-amino-1-hydroxy-biphenyl are particularly preferred.

Preferred oligomers corresponding to formula (II) are those which contain an average of 3 to 25, preferably 4 to 20 aromatic partial structures, an aromatic partial structure having the meaning defined under formula (I).

The preparation of the above-mentioned esters of formula (I) may be carried out e.g. in accordance with the teaching given in the unpublished German Patent Application P 3 824 365.2, namely by the reaction of the corresponding phenolic compounds or their alkali metal salts with suitable reactive derivatives of aromatic carboxylic acids by known esterification processes.

The above-mentioned compounds corresponding to formula (II) are prepared by known solvent-free and transesterification processes which are also used for the preparation of thermotropic LC polymers (direct esterification process (EP-A 00 88 546), the acetate process (EP-A 01 02 719 and 134 204) and solvent-free transesterification of carboxylic phenyl esters with diphenols (diphenylester process) (EP-A 072 540 070 539, 024 499 and 45 499, DE-OS 20 25 971 and EP 070 539 and 132 637)).

The compounds corresponding to formula (II) are described in the Applicant's own as yet unpublished German Patent Application P 3 831 121.6.

The compounds of formula (II) are most preferably prepared by the acetate and/or the diphenylester process. These compounds are oligomeric mixtures having average molecular weight (number average) of up to 4000 g mol$^{-1}$ preferably up to 2500 g mol$^{-1}$, in which both the above-mentioned structural units and the molecular weight may be in random distribution and which have liquid crystalline properties. They are introduced as additives to the polyarylene sulphides in the quantities given for (I), the liquid crystalline oligomeric compounds of formula (II) which are free from aliphatic units being preferred.

The liquid crystalline additives (I) and/or (II) may be used singly or as any mixtures. They are preferably used in quantities of from 1 to 20% by >;eight, most preferably from 2 to 15% by weight.

The preparation of the polyarylene sulphide moulding compounds according to the invention preferably is carried out solvent-free. All the mixing processes conventionally used for thermoplast processing, e.g. kneading or extrusion, are suitable for the preparation of the arylene sulphide polymers according to the invention.

The polyarylene sulphide moulding compounds according to the invention may also contain additives C), e.g. reinforcing materials (e.g. glass fibres or mineral fillers) UV stabilizers, anti-oxidants, plasticizers, fluidising agents, nucleating agents, polymeric alloying partners, (e.g. impact strength modifiers), flame retardants and other additives in quantities of from 0.001 to about 300% by weight, based on the sum of the weights of arylene sulphide polymers and the additives B) used according to the invention.

The modified polyarylene sulphide moulding compounds are distinguished by their reduced melt viscosity combined with a high degree of crystallisation. They may be worked up by known processes, e.g. for the production of moulded articles, films and other products.

The arylene sulphide polymers which have been modified according to the invention may advantageously also be used e.g. for the production of fibres, monofils and filaments. Addition of the liquid crystalline additives used according to the invention to arylene sulphide polymers is also particularly advantageous for melt spinning. Separately compounded material may be used for this purpose or, alternatively, the additives may be added to the arylene sulphide polymers during the spinning process at any point in front of the spinning dies, e.g. to the granulate before this is melted or to the melt. It is frequently desired to reduce the build-up of pressure in the spinning apparatus at a given temperature, especially in the region of the spinning die, in order to increase the reliability of the process. This is possible when the arylene sulphide polymers modified according to the invention are used.

Alternatively, when using the arylene sulphide polymers according to the invention, the spinning temperature, which in many cases is already at a critical level, may be lowered without altering the melt viscosity and consequently the build-up of pressure. It is thereby possible to suppress degradation reactions and side reactions which deleteriously affect the quality and the processing properties. Lowering of the temperature also enables the deposition of low molecular weight components in the outer region of the spinning die (e.g. at the die openings) to be reduced, e.g. when spinning PPS. As a result the number of filaments sticking together in the spun material is reduced and a lower ratio of thick/thin areas in the monofils and fibres is obtained.

The arylene sulphide polymers according to the invention also increase the reliability of processing in the subsequent stages of fibre manufacture such as stretching, crimping and fixing. This manifests itself particularly by a reduced formation of fluff when the threads are stretched. This in turn enables the overall speed of after-treatment to be increased.

The spun fibres obtained from the polyarylene sulphide moulding compounds according to the invention are also characterised by a more uniform and closed surface structure. This is particularly suitable for monofils and endless filament yarns.

The melt viscosities were measured, unless otherwise indicated, with a Contravis RM 300 plate-rone viscosimeter and the DSC measurements were carried out with a Perkin-Elmer-DSC System 7 apparatus.

The crystallisation enthalpy on cooling ($\Delta H_K$) determined by DSC measurement was used as a relative measure of the degree of crystallisation.

EXAMPLES

EXAMPLE 1 (not according to the invention)

Example of preparation of a low molecular weight, liquid crystalline ester corresponding to formula (I) according to P 3 824 365.2 to be used according to the invention 1st Stage: 4-Hydroxyphenyl-4-hydroxybenzoate 138.1 g of p-Hydroxybenzoic acid and 110.1 g of hydroquinone together with 2 g of boric acid and 2.5 g of sulphuric acid are suspended in 900 ml of xylene and heated under reflux until no more water is split off. The product is suction filtered, dried, washed with dilute sodium bicarbonate solution, again dried and dissolved in 500 ml of acetone. The solution is filtered from undissolved substances while still hot and the product is precipitated from water, suction filtered and dried. Yield: 182 g m.p.: 245°–247° C.

2nd Stage: 4-(4-Methylbenzoyloxy) benzoic acid-4-(4-methyl-benzoyloxy)-phenyl ester 345.3 g of 4-Hydroxyphenyl-4-hydroxybenzoate and 249 g of pyridine are suspended in 3000 ml of methylene chloride and to this suspension are added 460 g of 4-methylbenzoic acid chloride in the course of 3 hours at 0° C. The reaction mixture is then stirred for 14 hours at room temperature. The solvent is distilled off under vacuum and the residue is stirred with 1.4 l of 5% hydrochloric acid. The insoluble product is suction filtered, washed with water until neutral and dried. Yield: 643 g (85% of theoretical).

A liquid crystalline phase can be detected under the polarisation microscope in the range of 190°–350° C.

EXAMPLE 2

50 g of PPS granulate having a melt viscosity of 37–38 Pas at 320° C. and a shear gradient of 100 s$^{-1}$ were mixed in a round bottomed flask with 1.5 g of 4-(4-methylbenzoyloxy)-benzoic acid-4-(4-methylbenzoyloxy)-phenyl ester (LC Ester No-6) (corresponds to an additive content in the mixture of about 3% by weight) under nitrogen and the mixture was heated to 320° C. and homogenized with stirring. After the polymer had melted, the mixture was stirred for a total of 30 minutes. The heating baths were then removed and the mixtures were cooled to room temperature and the samples chopped up.

The results of the DSC investigations and of the melt viscosity determinations are given in the Table.

EXAMPLE 3

A mixture of 50 g of PPS and 5.5 g (=10% by weight) of the same liquid crystalline additive as that described in Example 1 was prepared by the method described in that Example.

The results of the DSC investigation and of determination of the melt viscosity are shown in the Table.

TABLE 1

| Example | Quantity of Additive (% by wt.) | SV* (PAS) | $\Delta H_K$ (J/g) |
| --- | --- | --- | --- |
| 2 | 3 | 28 | 44.1 |
| 3 | 10 | 17 | 45.5 |
| PPS | — | 37–38 | 44.4 |

*Melt viscosity at 320° C. and 100 s$^{-1}$

EXAMPLES 4 AND 5

PPS was modified with 5% by weight and 10% by weight of 4-benzoyloxy benzoic acid-4-(4-benzoyloxy)-phenylester (LC Ester No. 5) as described in Example 2. The melt viscosity values are shown in Table 2.

TABLE 2

| Example | % Additive (% by weight) | SV (PAS) (320° C., 100 s$^{-1}$) |
| --- | --- | --- |
| 4 | 5 | 13 |
| 5 | 10 | 10 |

TABLE 2-continued

| Example | % Additive (% by weight) | SV (PAS) (320° C., 100 s$^{-1}$) |
|---|---|---|
| PPS | — | 34 |

EXAMPLE 6 AND COMPARISON EXAMPLE 1

These Examples demonstrate the advantageous effect of the additives to be used according to the invention for the preparation of polyarylene sulphide fibres.

A polyphenylene sulphide having a melt viscosity of 140 Pas (320° C./10$^3$ sec$^{-1}$) was melted in an extrusion spinning apparatus and spun to form a multifilament thread. The spun material was then subjected to a two-stage after-treatment process (comparison Example 1).

A PPS which had been prepared from the same granulate by compounding with 5% of 4-benzoyloxybenzoic acid-4-(4-benzoyloxy)-phenyl ester (LC Ester No.5) was spun by the same process.

The spinning and after-treatment conditions and the mechanical and thermal properties of the resulting filament yarns are summarized in Table 3.

TABLE 3

|  | Ex. 6 | Comparison Ex. 1 |
|---|---|---|
| Spinning conditions |  |  |
| Melting temperature (°C.) |  |  |
| Extruder outlet | 331 | 330 |
| Die block | 314 | 315 |
| Pressure build-up (bar) |  |  |
| Extruder | 40 | 40 |
| Spinning pump | 63 | 80 |
| Die (Aperture number/diameter × channel length) | 30/0, 2 × 0.4 | 30/0, 2 × 0.4 |
| Screen filter (width of mesh) (nm) | 32 | 32 |
| Draw-off rate (m/min) | 250 | 250 |
| Spinning draft | 17.7 | 18.3 |
| After-treatment conditions |  |  |
| Stage 1: (Prestretching) |  |  |
| Stretching temperature (°C.) | 88 | 88 |
| Degree of stretching | 1:3.64 | 1:3.64 |
| Stage 2: (After-stretching + fixing) |  |  |
| Stretching temperature (°C.) | 160 | 160 |
| Degree of stretching | 1:1.3 | 1:1.3 |
| Degree of total stretching | 1:4.73 | 1:4.73 |
| Fixing temperature (°C.) (Heating gallette) | 190 | 203 |
| Fibre data (filament yarns) |  |  |
| Titre (60-filament) (dtex) | 235 | 237 |
| Strength (HZK) (= maximum tensile force) (cN/dtex) | 4.52 | 3.9 |
| Elongation (HZKD = Elongation at maximum tensile force) (%) | 16.3 | 15.1 |
| E-modulus (cN/dtex) | 57.0 | 47.6 |
| TMA breakage (°C.) | 277 | 277 |
| Boiling shrinkage (%) | 0.15 | 0.3 |

As may be seen from the data in Table 3, the fibres obtained from the PPS compound according to the invention have substantially superior properties to those of the comparison sample.

Moreover, the compound used in Example 6 could be after-treated more easily and more rapidly than the comparison sample. Capillary tears occurred at a much greater rate when the comparison sample was after-treated. The formation of fluff in the comparison sample was also substantially increased. This is reflected in the poorer mechanical properties of the filament yarns (strength, E-modulus:) of the comparison example.

Figure 4:
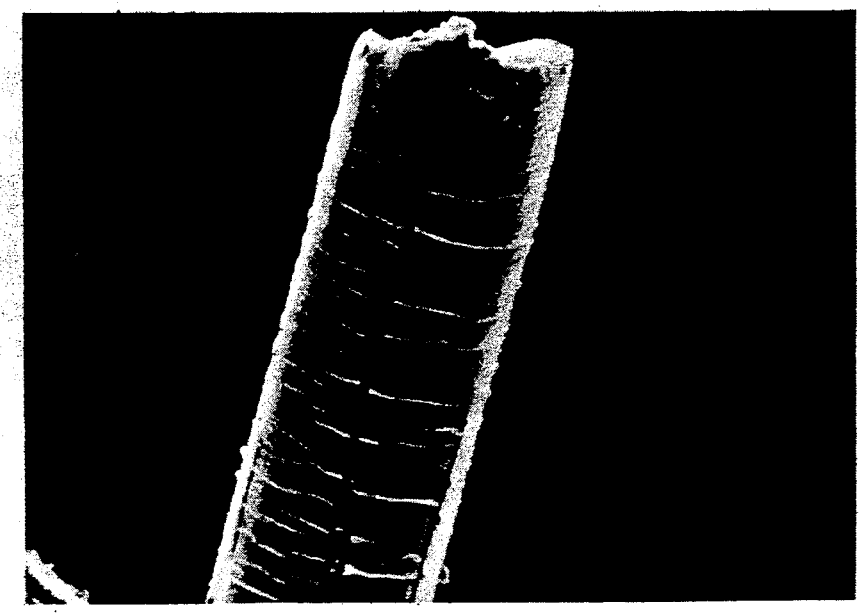

The more uniform and smoother surface structure of threads obtained from the PPS compound according to the invention is clearly recognised on raster electron microscopic (REM) photographs (FIGS. 1, 2 and 3) when these are compared with similar photographs of fibres not treated with the additive (FIGS. 4, 5 and 6).

EXAMPLE 7 (not according to the invention)

Preparation of a low molecular weight, liquid crystalline ester corresponding to formula (II) containing 10 aromatic partial structures by solvent-free esterification according to P 3 831 121.6.

3.31 kg of p-hydroxybenzoic acid, 2.64 kg of hydroquinone, 1.95 kg of benzoic acid, 2.66 kg of isophthalic acid, 7.49 kg of acetic anhydride and 0.91 g of magnesium powder were weighed into a 25 l autoclave. The contents were heated to 150° C. under a stream of nitrogen introduced at the rate of 40 l per hour. When this temperature was reached, it was maintained for half-an-hour while the autoclave contents were vigorously stirred.

When distillation subsequently slowed down, the temperature was raised stepwise to 270° C. with stirring, a vacuum of 30 mbar being applied in the last stages. The product was discharged from the autoclave and size reduced. Yield: 8.87 kg (96%)

The randomly structured Type II substance shows a liquid crystalline phase in the region of 190° to 350° C. under the polarisation microscope.

EXAMPLE 8 AND COMPARISON EXAMPLE 2

PPS Compounds reinforced with glass fibres and a mineral filler and containing either 5% of the low molecular weight, liquid crystalline ester of formula (II) with 10 aromatic partial structures prepared according to Example 7 or no LC ester were prepared at 323°–325° C. in a ZSK 32-double shaft extruder of Werner and Pfleiderer.

The results of mechanical tests and of melt viscosity measurements are described in Table 4.

TABLE 4

|  | Ex. 8 | Comparison Ex. 2 |
|---|---|---|
| LC ester (see Example 7) (%) | 5 | — |
| Ash content (%) | 54.2 | 56.7 |
| E$_Z$ (MPa) | 11074 | 11265 |
| Tensile strength (MPa) | 53.5 | 53.8 |
| Melt viscosity$^{1)}$ 1000 s$^{-1}$ | 101 | 165 |
| (320° C.) 1500 s$^{-1}$ | 94 | 161 |

$^{1)}$High pressure capillary viscosimeter, L/D = 30

The Example shows that the moulding compound according to the invention has a much lower viscosity while retaining the very good mechanical properties.

We claim:

1. New, highly fluid polyarylene sulphide moulding compounds, comprising
   A) from 70–99.9% by weight of polyarylene sulphides,
   B) from 0.1 to 30% by weight of one or more low molecular weight, liquid crystalline esters or ester amides of the general structural type corresponding to formula (I) or formula (II):

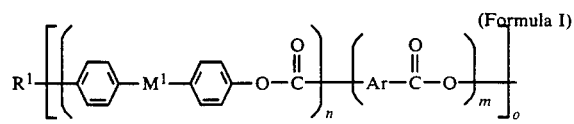
(Formula I)

$$-\!\!\left[\!\!\left\langle\!\!\bigcirc\!\!\right\rangle\!\!-M^2-\!\!\left\langle\!\!\bigcirc\!\!\right\rangle\!\!-\right]_p\!\!R^2$$

wherein
  Ar denotes an aromatic group with 6-20 carbon atoms which is mononuclear or polynuclear and the polynuclear group is linked through a bond or attached as a condensed group, and
  $R^1$ and $R^2$ denote independently of one another, H, chlorine, O—$C_1$–$C_4$-alkyl, O—$C_3$–$C_6$-cycloalkyl, O—$C_6$–$C_{14}$-aryl, $C_1$–$C_4$-alkyl, $C_3$–$C_6$-cycloalkyl, $C_6$–$C_{14}$-aryl, fluorinated $C_1$–$C_4$-alkyl, fluorinated $C_3$–$C_6$-cycloalkyl, fluorinated $C_6$–$C_{14}$-aryl, or a group corresponding to one of the formulae (1)/a) to (1)/l):

(groups (1.a)–(1.l), are shown in sequence)
wherein
  X again denotes the groups defined above for $^1$ and $R^2$
  $M^1$ and $M^2$ are identical or different and denote double bonded groups corresponding to the following formulae I.1 to I.11:

$$-\underset{\underset{O}{\|}}{C}-O-, \quad -\underset{\underset{O}{\|}}{C}-NH-, \quad -N=N-, \quad -\underset{\underset{\downarrow}{}}{N}=\underset{\underset{O}{}}{N}-,$$

$$-CH=N-, \quad -CH=CH-, \quad -C\equiv C-, \quad -O-\underset{\underset{O}{\|}}{C}-,$$

$$-HN-\underset{\underset{O}{\|}}{C}-, \quad -\underset{\underset{\downarrow}{}}{N}=\underset{\underset{O}{}}{N}$$

and —N=CH— formula (I.1)–(I.11) are given in their sequence, and
  m = zero, 1 or 2,
  n = 1 or 2,
  o = 1, 2, 3 or 4 and
  p = zero or 1, but when p = zero then
  $R^2$ can only be (1/a), (1/b), (1/c), or (1/d);

$$\left[R^3-\underset{\underset{O}{\|}}{C}\right]\!\!\left[\!\!-O-Ar^a-\underset{\underset{O}{\|}}{C}\!\!-\right]_b\!\!\left[\!\!-O-Ar^b-O\right]_c \quad \text{(II)}$$

$$-\!\left[\underset{\underset{O}{\|}}{C}-R^4-\underset{\underset{O}{\|}}{C}\right]_d\!\!\left[\!\!-NH-R^5-Y'\right]_e\!\!\left[\underset{\underset{O}{\|}}{C}-R^3\right]$$

wherein the structural unites are randomly distributed and
  $R^3$ denotes an alkyl group, or an optionally substituted, aryl group, and $$R^3-\underset{\underset{O}{\|}}{C}$$

is always and end group
  $Ar^a$ denotes bivalent, optionally substituted (with the substituents as in $R^3$) mononuclear or polynuclear aromatic groups having 6 to 24 carbon atoms,
  $Ar^b$ denotes bivalent, optionally substituted mononuclear or polynuclear aromatic groups having 6 to 30 carbon atoms,
  $R^4$ and $R^5$ denote $C_mH_{2m}$ wherein m = 0 to 40 ($R_4$) or 3 to 40 ($R_5$) or they denote optionally substituted bivalent mononuclear or polynuclear aromatic groups which, in the case of polynuclear groups, are either linked by a bond or attached by condensation, Y' denotes O, $$\underset{\underset{O}{\|}}{C} \quad \text{or NH}$$

and when it is linked to an end group of the formula $$\underset{\underset{O}{\|}}{C}-R^3$$

then it denotes O or NH, and
  b = zero to 10,
  c = 1 to 9,
  d = zero to 9, and e = zero to 3, and
the end groups are formed by structural elements of the type corresponding to the formula

and

C) optionally from 0.001 to approximately 300% by weight, based on the sum of the weight of components A) and B), of other additives.

2. Highly fluid polyarylene sulphide moulding compounds according to claim 1, characterized in that component B) corresponding to formulae (I) or (II) is used in quantities of from 1 to 20% by weight.

3. Highly fluid polyarylene sulphide moulding compounds, characterised in that component B) is:

(LA) Liquid crystalline compounds corresponding to formula (I) having three aromatic partial structures wherein m=zero, n=1, o=1 and p=zero:

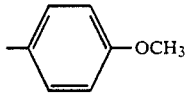

(LB) Liquid crystalline compounds of formula (I) having four aromatic partial structures, in which again m=zero, n=1, o=1 and p=zero:

(Formula IB)

| No. | R¹ | M¹ | R² |
|---|---|---|---|
| 5 | X¹=H | | X²=H |
| 6 | CH₃ | | CH₃ |
| 7 | OCH₃ | | OCH₃ |
| 8 | CF₃ | | CF₃ |
| 9 | Cl | | Cl |

(LC) Liquid crystalline compounds of formula (I) having five aromatic partial structures, in which m=n=o=p=1:

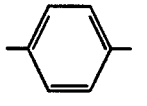

| No. | R¹ | M¹ | M² | R² | Ar |
|---|---|---|---|---|---|
| 10 | H | -O-C(=O)- | -C(=O)-O- | H | (phenyl) |
| 11 | CH₃ | " | " | CH₃ | " |
| 12 | OCH₃ | " | " | OCH₃ | " |
| 13 | H | -C(=O)-O- | -O-C(=O)- | H | " |
| 14 | CH₃ | " | " | CH₃ | " |
| 15 | OCH₃ | " | " | OCH₃ | " |

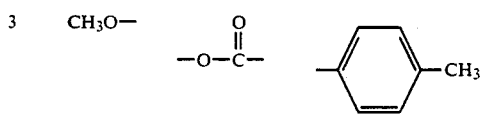

(LD) Liquid crystalline compounds of formula (I) having seven aromatic partial structures, in which again m=n=o=p=1:

(Formula ID)

| No. | R¹ | M¹ | Ar | M² | R² |
|-----|----|----|----|----|----|
| 16 | H₃C–⌬–C(=O)–O– | –C(=O)–O– | –⌬– | –O–C(=O)– | –O–C(=O)–⌬–CH₃ |
| 17 | ⌬–C(=O)–O– | –C(=O)–O– | –⌬– | –O–C(=O)– | –O–C(=O)–⌬ |
| 18 | ⌬–O–C(=O)– | –O–C(=O)– | –⌬– | –C(=O)–O– | –C(=O)–O–⌬ |
| 19 | CH₃–⌬–O–C(=O)– | –O–C(=O)– | –⌬– | –C(=O)–O– | –C(=O)–O–⌬ | and in that as component B) corresponding to formula (II) have an average of 3–25 aromatic partial structures, and average molecular weights (number average) of up to 4000 g mol$^{-1}$.

4. Highly fluid polyarylene sulphide moulding compounds according to claim 1, characterised in that the structural units used for the liquid crystalline compounds of formula (II) are 4-hydroxy-3-methylbenzoic acid, 4-hydroxy-3-methoxybenzoic acid, 4-hydroxybenzoic acid, 3-hydroxybenzoic acid, 6-hydroxy-2-naphthoic acid, hydroquinone, 4,4'-dihydroxydiphenyl, 4,4'-dihydroxydiphenylether, 4,4'-dihydroxydiphenyl ethane, 4,4'-dihydroxydiphenoxyethane, 3,5'-dihydroxydiphenyl, 3,5'-dihydroxydiphenylether, 1 5-dihydroxynaphthalene, 2,6-dihydroxynaphthalene, 1,4-dihydroxynaphthalene, methyl hydroquinone, phenyl hydroquinone, 2,2'-dimethyl-4,4'-dihydroxydiphenyl, 3,3',5,5'-tetramethyl-4,4'-dihydroxydiphenyl. 1,2-(2-chloro-4-hydroxyphenoxy)-ethane, 4-methoxy-2,6-dihydroxynaphthalene, resorcinol, 3,4'-dihydroxydiphenyl, 1,6-dihydroxynaphthalene, 1,7-dihydroxynaphthalene, 2,7-dihydroxynaphthalene, 4-chlororesorcinol, 4-phenyl-resorcinol, 4-ethoxyresorcinol, 2,5-dichloro-1,6-dihydroxynaphthalene, 4-methoxy-2,7-dihydroxynaphthalene, 1,4-naphthalene dicarboxylic acid, 1,5-naphthalene dicarboxylic acid, 2,6-naphthalene dicarboxylic acid, biphenyl-4,4'-dicarboxylic acid, biphenyl-3,3'-dicarboxylic acid, diphenoxyethane-4,4'-dicarboxylic acid, diphenylether-4,4'-dicarboxylic acid, methyl terephthalic acid, methoxy terephthalic acid, chloro terephthalic acid, 4-chloronaphthalene-2,7-dicarboxylic acid, 2,6- or 2,7-naphthalene dicarboxylic acid, biphenyl-3,4'-dicarboxylic acid, 4-methylisophthalic acid, 5-methylisophthalic acid, diphenylether-4,4'-dichloro-3,3'-dicarboxylic acid, iso- and terephthalic acid, ε-aminocaproic acid or caprolactam, ω-aminoundecanoic acid, ω-aminododecanoic acid or lauryl lactam and 4-aminocyclohexyl carboxylic acid, 4-aminobenzoic acid, 6-amino-2-naphthoic acid, 3-aminophenol, 4-aminophenol, 3-amino 2-methylphenol, 3-amino-4-methylphenol, 5-amino-1-naphthol, 6-amino-1-naphthol, 5-amino-2-naphthol, 7-amino-2-naphthol, 8-amino-2-naphthol, 6-amino-2-naphthol, 4'-amino-1-hydroxybiphenyl, oxalic acid, succinic acid, adipic acid, suberic acid, azelaic acid, trimethyladipic acid, sebacic acid, dodecanoic di-acid and dimeric fatty acids, benzoic acid, 4-methylbenzoic acid, 4-methoxybenzoic acid and 4-biphenyl carboxylic acid.

5. Highly fluid polyarylene sulphide moulding compounds according to claim 1, characterised in that the structural units used for the liquid crystalline compounds of formula (II) are hydroquinone, 4,4'-dihydroxydiphenyl, 4-aminophenol, 3-aminophenol, 4'-amino-1-hydroxybiphenyl, 4-hydroxybenzoic acid, 3-hydroxybenzoic acid, 6-hydroxy-2-naphthoic acid, oxalic acid, adipic acid, sebacic acid, dimeric fatty acids, isophthalic acid, terephthalic acid, 1,4-naphthalene dicarboxylic acid, 1,5-naphthalene dicarboxylic acid, 2,6-naphthalene dicarboxylic acid, 4,4'-biphenyl dicarboxylic acid, aminocaproic acid or caprolactam, 4-aminobenzoic acid, 6-amino-2-naphthoic acid, benzoic acid, 4-methylbenzoic acid and 4-biphenylcarboxylic acid.

6. Highly fluid polyarylene sulphide moulding compounds according to claim 1, characterised in that they contain from 0.001 to approximately 300% by weight of reinforcing materials, plasticizers, anti-oxidates, pigments, weathering stabilizers (or combinations thereof), nucleating agents, polymeric alloying components and flame retardants.

7. Moulded articles, films, composites and other products made from polyarylene sulphide moulding compounds according to claim 1.

8. Fibres, monofils, filaments and woven webs of polyarylene sulphide moulding compounds according to claim 1.

9. Molding compounds according to claim 1 wherein component A) is polyparaphenylene sulphide.

10. Molding compounds according to claim 1 wherein $R^3$ in formula (II) denotes methyl, a mono- or disubstituted aryl group or a phenyl group.

11. Molding compounds according to claim 1 wherein component B) is a liquid ester amide corresponding to formula (II) wherein b is zero to 8, c is 1 to 7, d is zero to 7, and e is zero to 2.

12. Molding compounds according to claim 11 wherein b is zero to 4, c is 1 to 4, and d is zero to 3.

13. Molding compounds according to claim 2 wherein component B) is used in quantities from 2 to 15% by weight based on the weight of the composition.

14. Molding compounds according to claim 3 wherein component B) has an average molecular weight up to 2500 g mole$^{-1}$.

* * * * *